Nov. 6, 1962　　A. H. SCHMALFELDT　　3,062,033
REMOTE CONTROL APPARATUS FOR RELEASING
A VEHICLE TRUNK DOOR LOCK
Filed Dec. 14, 1960　　2 Sheets-Sheet 1
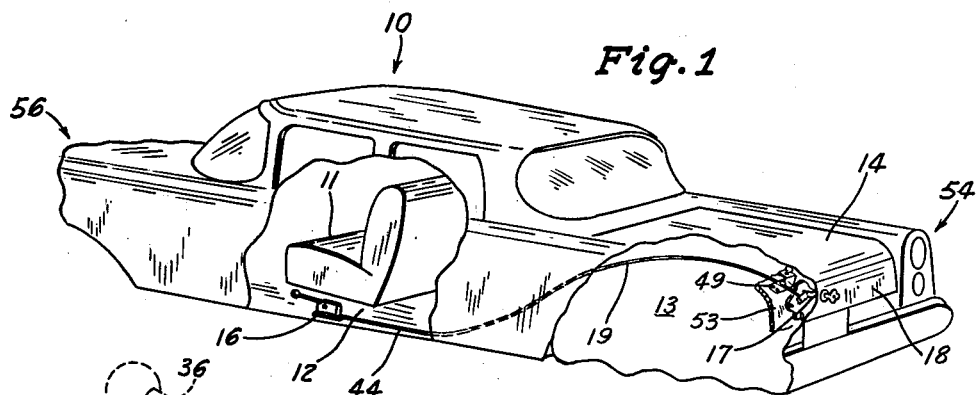
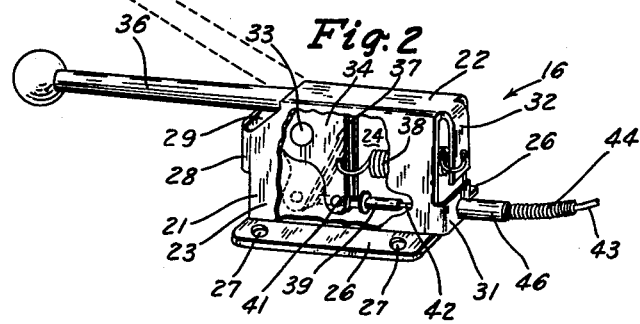
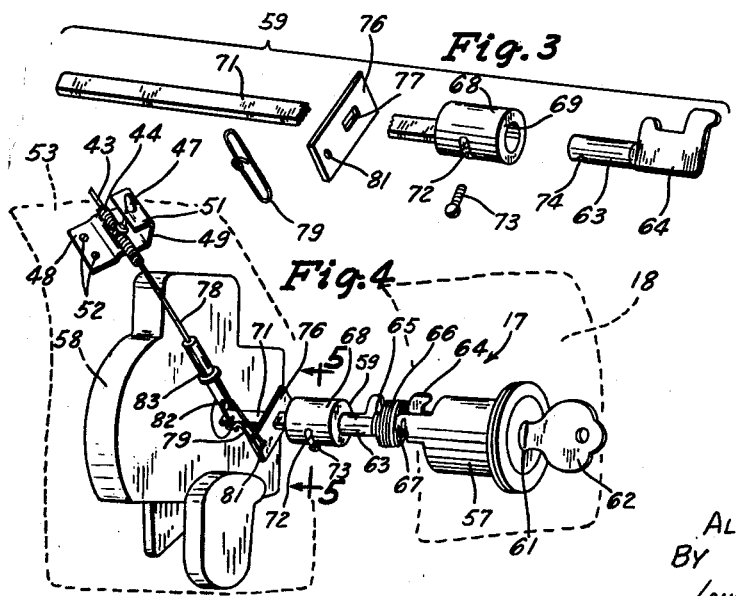
INVENTOR
ALFRED H. SCHMALFELDT
BY
Lowell & Henderson
ATTORNEYS

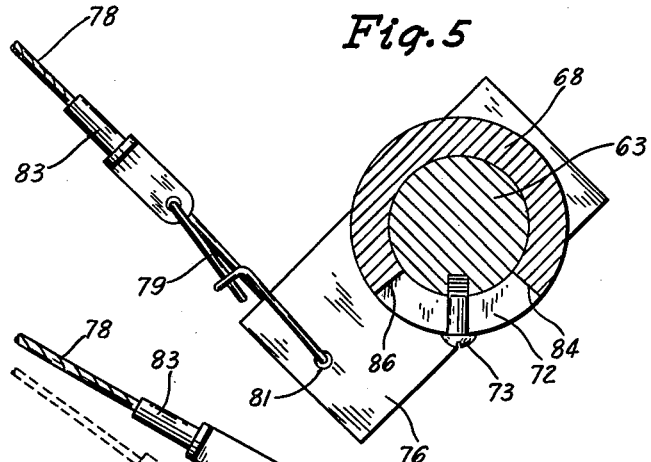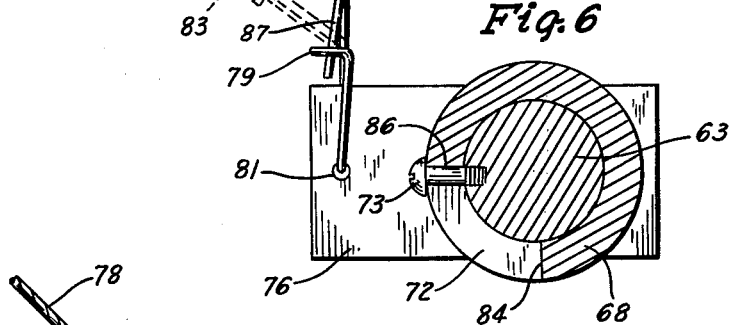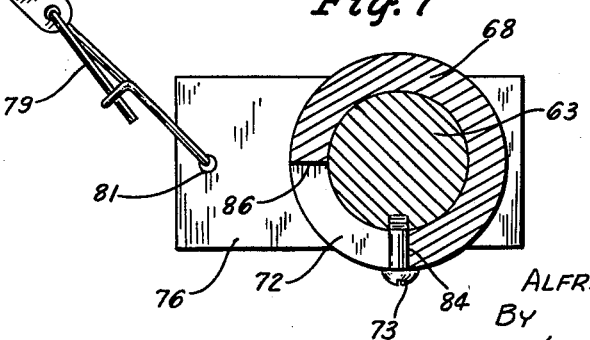

United States Patent Office 3,062,033
Patented Nov. 6, 1962

3,062,033
REMOTE CONTROL APPARATUS FOR RELEASING A VEHICLE TRUNK DOOR LOCK
Alfred H. Schmalfeldt, Des Moines, Iowa, assignor to The Delman Company, Cookeville, Tenn., a corporation of Tennessee
Filed Dec. 14, 1960, Ser. No. 75,779
3 Claims. (Cl. 70—256)

This invention relates to automotive vehicles having trunks or luggage compartments, and more particularly to remotely controlled apparatus for releasing the luggage compartment door lock.

An object of this invention is to provide an improved apparatus for a vehicle for releasing the luggage compartment door lock from within the passenger compartment of the vehicle.

Another object of this invention is to provide an apparatus for a conventional luggage compartment door lock whereby the operator of the vehicle can release the lock without moving from his seat.

Yet another object of this invention is to provide an apparatus for adaptation to a conventional luggage compartment door lock having a shaft extended between the tumbler structure and the latch structure of the lock, which shaft is turnable to release the latch by a key inserted into the tumbler structure from outside the vehicle, wherein the apparatus provides for turning the shaft from a remote location within the passenger compartment to effect a release of the latch structure independently of the key.

A further object of this invention is the provision of an apparatus for providing the above mentioned objectives which is economical, serviceable and effective.

These objects and other features and advantages of this invention will become readily apparent upon reference to the following disclosure and the accompanying drawings, wherein:

FIG. 1 is a fragmentary perspective view of an automobile embodying the present invention, certain parts being broken away for clarity of illustration;

FIG. 2 is an enlarged perspective detail view of the hand release unit of the invention, certain parts being broken away for purposes of clarity;

FIG. 3 is an enlarged exploded detail view in perspective of a shaft unit of the invention;

FIG. 4 is an enlarged perspective view of a trunk lock unit of this invention;

FIG. 5 is an enlarged cross sectional view taken along the line 5—5 in FIG. 4, and showing parts of the trunk lock unit in their normal positions;

FIG. 6 is a view similar to FIG. 5 and showing the relative position of the parts when a key is used to release the trunk lock; and FIG. 7 is a view similar to FIG. 5 and showing parts of the trunk lock unit when the hand release unit is used to release the trunk lock.

Referring now to the drawings, an automobile 10 is illustrated in FIG. 1 as including a front seat 11 mounted on the floor 12 of the automobile, and a luggage compartment or trunk 13 having an upwardly swingable deck lid or door 14. The remote control lock release assembly of this invention is shown in assembly relation with the automobile 10 and comprises a hand release unit 16 mounted on the floor 12 next to the driver's seat 11, a trunk lock unit 17 mounted on the rear panel 18 of the deck lid 14, and a cable unit 19 operatively connecting the hand release unit 16 to the trunk lock unit 17.

The hand release unit 16 (FIG. 2) includes a housing 21 having a top wall 22, side walls 23 and 24, and a pair of outwardly extended base flanges 26 in which are formed holes 27 for the insertion therethrough of screws (not shown) into the floor 12 for mounting the housing 21. A first extension 28 of one side wall 23 is bent across what shall be termed the front of the housing 21 so as to form with the top wall 22 an opening 29 for a purpose hereinafter described. A second extension of the side wall 23 is bent across what shall be termed the rear of the housing 21, and an extension 32 of the top wall 22 is bent downwardly so as to form a back wall, as best illustrated in FIG. 2.

Pivotally mounted within the housing 21 by a rivet 33 is a right angularly formed handle 34. A knob portion 36 of the handle 34 extends through the opening 29 and externally of the housing 21 so as to be within easy reach of the driver in the front seat 11. A leg portion 37 of the handle 34 which depends internally of the housing 21 is connected by a return spring 38 to the back wall 32. By this arrangement, the handle 34 is biased toward the position shown in full lines in FIG. 2, with the handle 34 being pivotally movable by the driver to the pivoted position shown by dotted lines in FIG. 2. An eye clamp 39 is pivotally mounted by a rivet 41 to the lower end of the leg portion 37 and is secured to one end 42 of a control wire 43 which is part of the cable unit 19.

The cable unit 19, in addition to the control wire 43, includes an elongated sheath or casing 44 (FIG. 1) one end of which is secured by a shoulder bushing 46 (FIG. 2) to the hand release housing 21, and the other end of which is secured between a thumb screw 47 (FIG. 4) and a leg 48 of a U-shaped clamp 49. The thumb screw 47 is threaded through the upper leg 51 of the clamp 49, the lower leg 48 of which is secured as by screws 52 to the rear or inner panel 53 of the deck lid 14, the panel 53 being shown by dotted lines in FIG. 4. When installed in the automobile 10, the casing 44 extends rearwardly of the hand release unit 16 beneath a rear seat floor mat (not shown) and is then passed upwardly behind a rear seat (not shown) in the automobile and under the deck lid 14 to its location adjacent the trunk lock unit 17 (FIG. 1). By this arrangement, upon pivotal movement of the handle 34 (FIG. 2) to its dotted line position, the control wire 43 is pulled forwardly, or from the rear of the automobile, indicated generally at 54 in FIG. 1, toward the front 56 of the automobile, and away from the trunk lock unit 17.

Referring particularly to FIG. 4, the trunk lock unit 17 of the invention is shown as including a tumbler assembly 57, a conventional latch 58, and a shaft assembly 59 connected between the tumbler assembly 57 and the latch 58. The tumbler assembly 57 is mounted on the rear panel 18 and has a keyhole 61 exposed to the rear of the automobile 10 so that a key 62 can be inserted. The latch 58 is mounted on the inner panel 53 for coaction with a portion (not shown) of the automobile so that when the deck lid 14 is closed (FIG. 1) the latch 58 locks the deck lid closed.

The shaft assembly 59 is provided for releasing the latch 58 from its locking position either by rotation of the key 62, or by upward pivotal movement of the handle 34 as described further hereinafter. As seen particularly in FIG. 3, the shaft assembly 59 includes a shaft 63 one end 64 of which is flat and irregularly shaped and adapted to be inserted into and held for movement with a rotatable element 65 (FIG. 4) at the rear of the tumbler assembly 57. The element 65 is rotated by rotation of the key 62 and is biased to its initial position by a coil spring 66 connected between it and a stationary projection 67 on the tumbler assembly 57. Thus, rotation of the key 62 against the bias of the coil spring 66 rotates the element 65 and the shaft 63.

The shaft assembly includes further a sleeve 68 (FIG. 3) having a bore 69 of sufficient diameter to rotatably receive one end of the shaft 63. An arcuate slot 72 is formed in the sleeve 53 and is extended in the direction of rotation of the sleeve. Coaction between the sleeve 68 and the shaft 63 is provided by a screw 73 which is inserted through the slot 72 and into a threaded hole 74 in the shaft 63, the screw 73 being movable upon rotation of the shaft 63 longitudinally of the slot 72. For transmitting rotational movement of the sleeve 68 to the latch 58, an elongated bar 71 is provided. The bar 71 is integral with and extended from a closed end of the sleeve 68 into operative engagement with the latch 58, whereby upon a certain amount of rotation of the bar 71, the latch 58 is released from its deck lid locking position.

A rock arm 76 is provided for rotating the bar 71 by operation of the hand release unit 17, and is connected to the bar 71 by means of a rectangular opening 77 formed at one end of the arm 76 and through which the bar 71 extends. To operatively connect the outer end of the arm 76 to the rear end 78 (FIG. 4) of the control wire 43, a wire link 79 of a structure similar to a safety pin is pivotally connected at one end through a hole 81 in the arm 76 and at the other end through a hole 82 in an eye clamp 83 to which the end 78 of the wire 43 is secured.

In the operation of the remote control lock release assembly, when the deck lid 14 is closed and the latch 58 is locked the hand release unit 16 is in the normal position of FIGS. 1 and 2 where the handle knob portion 36 is substantially parallel to the floor 12, and the trunk lock unit 17 is in the normal position best illustrated in FIG. 4. Referring to FIG. 5, a cross sectional view of the shaft assembly 59 shows that the screw 73 is normally in a vertically depending position midway between the ends 84 and 86 of the slot 72. The arm 76 is extended downwardly at an inclined angle of approximately 45° from the vertical, with enough tension between the control wire eye clamp 83 and the link 79 to form a substantially straight line between the arm hole 81 and the clamp 49 (FIG. 4).

To unlock the latch 58 by action of the key 62 (FIG. 4), the key 62 is inserted into the tumbler keyhole 61 and rotated clockwise (FIG. 4) against the bias of the coil spring 66. The shaft 63 rotates (FIG. 6) freely until the screw 73 engages the end 86 of the slot 73 so that continued rotation of the shaft 63 causes a clockwise rotation of the sleeve 68, as indicated by the arrow in FIG. 6. Rotation of the sleeve 68 is transmitted by the bar 71 into the latch 58 and continues by action of the key 62 until the latch 58 is released from its locking condition.

Thus at the position of the parts as shown in FIG. 6, when the latch 58 is released from its locking condition, the shaft 63 has been rotated approximately 90° and the sleeve 68 about 45°. Importantly, so that the movement of the arm 76 is not transmitted to the control wire 43 and against the bias of the return spring 38 (FIG. 2), the pivotal mounting of the link 79 at both its ends enables the link 79 to become cocked at an angle (see FIG. 6) relative to the eye clamp 83 to effect a lost motion therebetween. Also, due to the loose connection of the link 79 with the eye clamp 83, the eye clamp at times actually slides down one leg 87 of the link 79, as illustrated by dotted lines in FIG. 6, to effect the lost motion action. After the latch 58 is released, the key 62 is released and the trunk lock unit 17 returns to the normal position of FIG. 5.

When the driver of the automobile desires to release the latch 58 so as to unlock the deck lid 14 without moving from his seat 11, he merely pulls up on the handle knob portion 36 until it is in the dotted line position of FIG. 2. This pivotal motion moves the leg portion 37 of the handle 34 forward or to the left in FIG. 2 and pulls the control wire 43 through the stationary casing 44. The rear end 78 (FIG. 4) of the wire 43 pulls upwardly on the link 79 and rotates the arm 76 and the sleeve 68 in a clockwise direction, as indicated by the arrow in FIG. 7, until the bar 71 is rotated sufficiently to release the latch 58 from its locking position. Thus, when the sleeve 68 is rotated by action of the handle 34 to the position illustrated in FIG. 7, which is identical to its latch releasing position of FIG. 6, it is seen that a complete lost motion movement is had by the sleeve 68 relative to the shaft 63 as the latter is not moved from its normal position of FIG. 5. This enables the hand release unit 16 to release the latch 58 independently of the key operated tumbler assembly 57. Upon a release of the knob portion 36 by the driver, the return spring 38 and the spring (not shown) in the latch 58 coact to return the control wire 43, arm 76, sleeve 68, and the shaft 71 to their normal positions.

In summation, an apparatus is disclosed for remotely releasing the luggage compartment door or deck lid of an automobile from within the passenger compartment, and wherein the tumbler structure of the trunk door lock operable by a key for releasing the lock latch is not operated and is completely by-passed by the action of the remotely controlled apparatus in releasing the latch. In turn, the lock is operated in the usual manner by a key without interference from the remote control apparatus.

Although a preferred embodiment of the invention has been disclosed herein, various modifications and alterations can be made without departing from the scope of the invention as defined in the appended claims. It should also be noted that the remote control lock release assembly is not to be limited in use to vehicle trunk doors as described herein, as the assembly is usable in other locking arrangements, such as horizontally swingable doors where the relation of the tumbler-shaft-latch assemblies is similar to that disclosed herein.

I claim:
1. Apparatus for releasing a latch from a locked position comprising, a bar inserted in said latch and rotatable from a first position to a second position for releasing said latch, key-operated tumbler means including a shaft rotatably connected to said bar and rotatable from one position to another position during which rotation said tumbler means engages and moves said bar to said second position, said bar rotatable between said first and second positions independently of said tumbler means, and means operatively connected to said bar for moving said bar from said first position to said second position independently of said tumbler means.

2. Apparatus for releasing a latch from a locked position, the latch including a conventional tumbler device rotatable only by means of a key, the apparatus comprising a bar one end of which is rotatably inserted into said latch, and including further a sleeve integral with said bar at the other end thereof, said bar rotatable from a first position to a second position whereby said latch is released from its locking condition, shaft means operatively connected to the tumbler device for retractable rotation by rotation of the tumbler device by a key, said shaft means inserted into said sleeve and operatively connected thereto for moving said bar to said second position upon rotation of the tumbler device by the key, and means operatively connected to said bar for moving said bar from said first position to said second position independently of said shaft means.

3. Apparatus for releasing a latch from a locked position, the latch including a conventional tumbler device rotatable by means of a key, the apparatus comprising a bar one end of which is rotatably inserted into said latch, and including further a sleeve integral with said bar at the other end thereof, said sleeve having an arcuate slot formed therein which is extended in the direction of rotation of said sleeve, said bar being rotatable from a first position to a second position whereby the latch is unlocked, shaft means including a shaft one end of which is rotatably connected to the tumbler device and the other end of which is rotatably inserted into said sleeve, a connecting screw inserted through said slot and secured to said other end of said shaft for movement longitudinally of said slot, said shaft rotatable upon rotation of the tumbler device by the key from one position to another position during which rotation said screw engages said sleeve at one end of said slot and rotates said bar from said first position to said second position, and means including a rock arm secured to said bar and operable to rotate said bar from said first position to said second position independently of said shaft means, said slot being of a length that upon rotation of said bar from said first position to said second position the other end of said slot remains spaced from said screw.

References Cited in the file of this patent
UNITED STATES PATENTS

| | | |
|---|---|---|
| 2,616,739 | Allen | Nov. 4, 1952 |
| 2,688,865 | Foster et al. | Sept. 14, 1954 |
| 2,693,381 | Butler | Nov. 2, 1954 |
| 2,725,248 | Rimkus | Nov. 29, 1955 |
| 2,896,990 | Garvey et al. | July 28, 1959 |